United States Patent [19]
Krauer

[11] Patent Number: 5,873,649
[45] Date of Patent: Feb. 23, 1999

[54] CLAMP-ON FLASHLIGHT STAND

[76] Inventor: Alwin Krauer, 5314 North Winthrop, Apt. 2-West, Chicago, Ill. 60640

[21] Appl. No.: 980,648

[22] Filed: Dec. 1, 1997

[51] Int. Cl.⁶ .................................................. F21L 15/14
[52] U.S. Cl. ........................ 362/191; 362/190; 362/208; 362/396
[58] Field of Search ................................. 362/190, 191, 362/208, 382, 396; 248/316.7, 229.15, 229.17

[56] References Cited

U.S. PATENT DOCUMENTS

| | | |
|---|---|---|
| 2,089,111 | 8/1937 | Bussey ...................................... 362/396 |
| 2,726,321 | 12/1955 | Riotto ...................................... 362/191 |
| 3,970,228 | 7/1976 | Keller . | |
| 4,058,719 | 11/1977 | Chopp . |
| 4,208,703 | 6/1980 | Orr . |
| 4,307,862 | 12/1981 | Claussen . |
| 4,907,769 | 3/1990 | Hunley, Jr. . |
| 4,938,440 | 7/1990 | Weinfield . |
| 5,448,457 | 9/1995 | Adjeleian ................................. 362/208 |

*Primary Examiner*—Y. Quach
*Attorney, Agent, or Firm*—Greer, Burns, & Crain, Ltd.

[57] ABSTRACT

A combination flashlight and flashlight support is provided, wherein the generally tubular support releasably attaches to the flashlight body. The support is constructed and arranged to attach at at least one end of the flashlight. The support projects the flashlight at an oblique angle to a longitudinal axis of the flashlight body, and maintains the flashlight in an elevated position. When not in use, the support is securable to the body in a coaxial position.

14 Claims, 2 Drawing Sheets

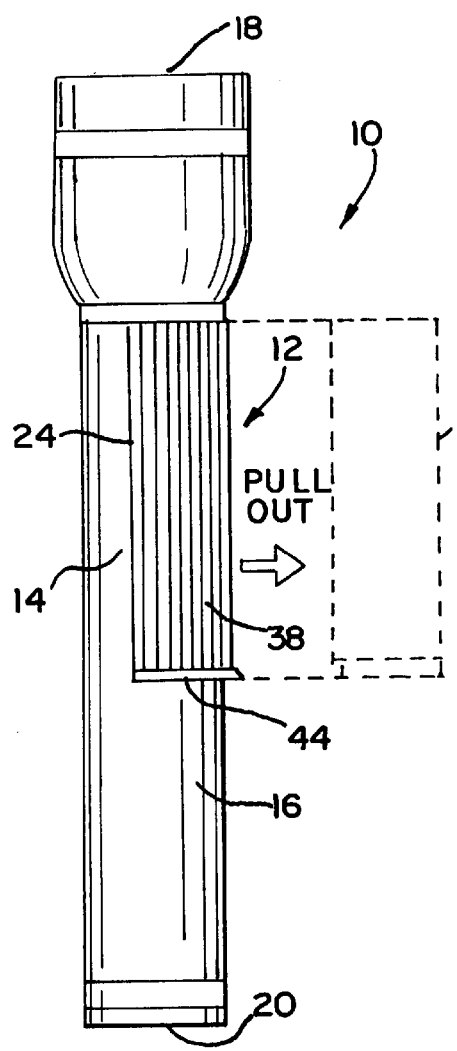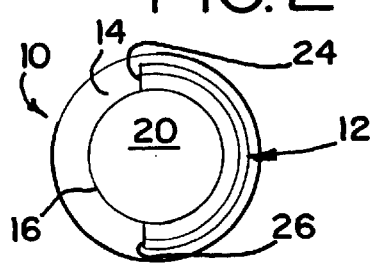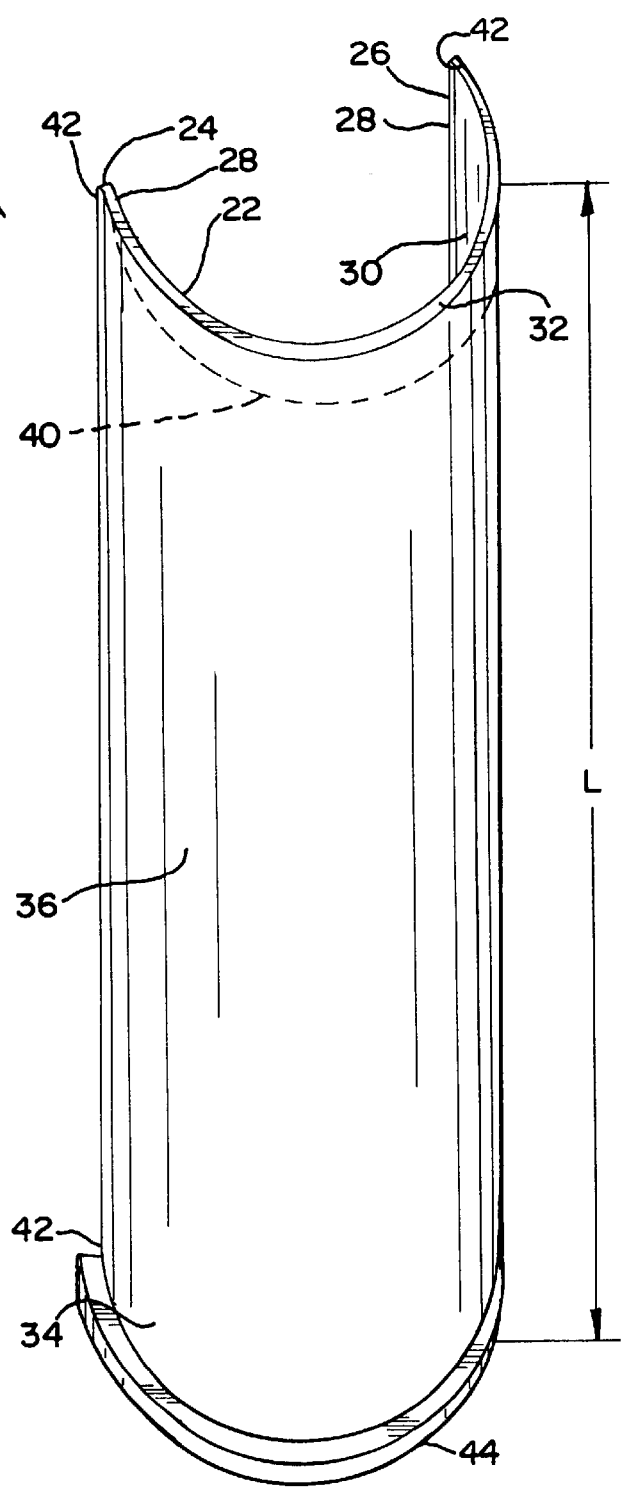

CLAMP-ON FLASHLIGHT STAND

BACKGROUND OF THE INVENTION

This invention relates to illumination devices such as flashlights, and illumination device supports which allow an illumination device to be directed in a particular fashion to allow illumination of desired target areas. In particular, this invention relates to flashlight supports which allow the positioning of flashlights so that the light need not be hand held.

While repair of equipment, camping activities, emergency auto repair or other activities performed in the dark often require light to be directed at the area being worked upon, there are many problems with conventional devices utilized to perform the task. Traditionally, one may use a "trouble light" to illuminate an area being worked upon. The "trouble light," however, usually requires an AC power source to supply power to the "trouble light" through a long and cumbersome extension cord. In other circumstances, the "trouble light" may cause an unacceptable hazard, such as the ignition of explosive vapors which the "trouble light" may ignite.

In the alternative, one may then utilize a conventional flashlight, yet there are also many problems incumbent upon the use of the flashlight. First, one can aim a self-supported conventional flashlight only in a vertical or horizontal position relative to a flat surface. One cannot otherwise aim the flashlight without utilizing either one or two of their hands or requiring an extra person to hold the flashlight. Second, if one were to aim the flashlight in the conventional sense, the user's hands would not be free to perform the required task. Third, the conventional flashlight supports do not adequately solve both problems of aimability and support. For example, U.S. Pat. No. 4,208,703 discloses a device holder for use with a flashlight. This prior art holder utilizes multiple components including a shaft housing, a cam, legs and interlocking hardware. Because the prior art holder consists of multiple parts, it tends to be relatively complicated to utilize, assemble, and manufacture. Further, the prior art holder is not releasably securable to the flashlight for convenient carrying and storage.

Thus, there is a need for a flashlight combined with a flashlight support to provide aimability, support, and versatility to the flashlight. There is also a need for a flashlight support which is readily securable to the flashlight when not in use.

A first object of the present invention is to provide an improved support for a flashlight which permits the projection of illumination in a desired direction while leaving the user's hands free to perform other tasks.

Another object of the present invention is to provide an improved flashlight support which is positionable on the flashlight to provide a variety of elevated support positions.

Still another object of the present invention is to provide an improved flashlight support which can be compactly secured to the flashlight when not in use.

BRIEF SUMMARY OF THE INVENTION

The above listed objects are met or exceeded by the present invention, which provides a flashlight support featuring aimability and hands free support for a flashlight. The purpose of the invention is to direct and hold a light source in a variety of use designated positions. Advantages of the present flashlight support over the prior art include the invention's versatility, mobility, and safety in volatile situations. Another advantage of the present flashlight support is the lightweight and easy to use characteristics of the invention. Additionally, unlike prior art flashlight supports, the present flashlight support requires no assembly, and when not in use, is compactly attached to the flashlight body without extraneous fasteners, brackets or tools.

More specifically, the present invention provides a combination flashlight and flashlight support. The flashlight has a body, an outside diameter, an illuminating end, and a butt end. Included on the present support is a top end, a bottom end, and an inside diameter. The present support is constructed and arranged to attach at at least the top end to the flashlight body to project the flashlight at an oblique angle to a longitudinal axis of the flashlight body. Additionally, the support maintains the flashlight in an elevated position, and when not in use the support is securable to the body in a coaxial position.

BRIEF DESCRIPTION OF THE SEVERAL VIEWS OF THE DRAWINGS

FIG. 1 is a side view of a flashlight suitable for use with the present flashlight support, the latter shown secured to the flashlight in a coaxial orientation;

FIG. 2 is a bottom view of the flashlight and the flashlight support as shown in FIG. 1;

FIG. 3 is a perspective view of the present flashlight support;

DETAILED DESCRIPTION OF THE INVENTION

Figure 5:
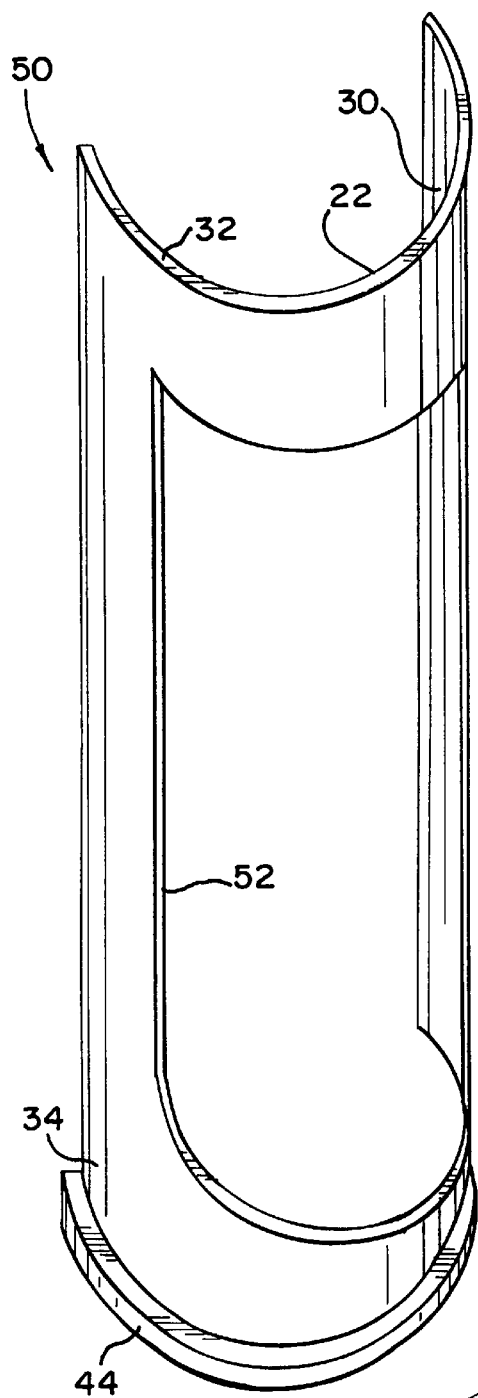
FIG. 5 is a diagrammatic perspective view of an alternative embodiment of the present flashlight support.

Referring now to the drawings and particularly to FIG. 1, a flashlight, generally designated 10 is equipped with the present support, generally designated 12. The flashlight 10 includes a body 14 having an outside diameter 16, an illuminating end 18, and a butt end 20 opposite the illuminating end 18. As is well known, the flashlight 10 includes a power source such as a battery pack or power supply (not shown) enclosed within the body 14. Rechargeable as well as disposable power supplies are contemplated. By means of a switch (not shown), the power supply is connected to a bulb or equivalent light source (not shown) disposed at the illuminating end 18 to provide a source of light. Moreover, FIG. 1 shows the support 12 in both a clamp-on position and a released position 12a (shown in phantom).

Referring now to FIGS. 1, 2 and 3, the support 12 has an inside diameter 22 and a semi-circular "C-shape" tubular configuration when viewed in cross-section. Preferably, the support 12 is manufactured from a self supportive but flexible plastic which is durable and resistant to environmental factors of rain, extreme temperatures and sunlight. Exemplary materials include polystyrene, polyethylene, and PVC or equivalent materials. In the preferred embodiment, the support 12 has a length 'L' which is approximately one-half a length of the body 14, and a pair of side edges 24, 26 which define a longitudinal slot 28. The slot 28 allows the support to temporarily flex open and to be pressed onto the body 14. Further, the inside diameter 22 of the support 12 is dimensioned to circumscribe at least a portion of the flashlight body 14. Preferably, the support 12 covers approximately 190° of the body 14 when viewed in cross-section.

The inside diameter 22 of the support 12 is dimensioned, and the support itself is sufficiently flexible, so that an inside surface 30 of the support 12 grips the body 14 with a friction fit without the use of extraneous clamps, brackets or hardware.

Figure 4:
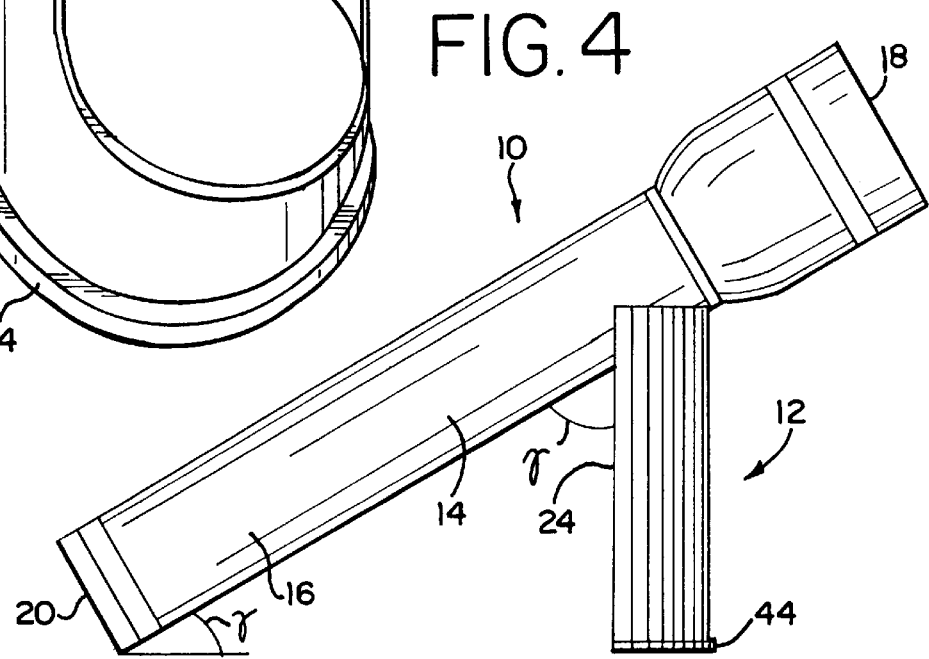
FIG. 4 is a side view of a flashlight suitable for use with the present flashlight support, the flashlight being supported in an elevated position by the support.

Referring now to FIG. 3, a perspective view of the present flashlight support 12 is shown having a top end 32, a bottom end 34, and an outer surface 36 of the support which preferably has a plurality of spaced, parallel ribs 38 (best seen in FIG. 1) or equivalent texturing to allow ease of gripping. The top end 32 may by provided with a cut out or recessed edge 40 (best seen in FIG. 3, shown in phantom) to accommodate the more elliptical contact profile of the flashlight body 14 when oriented at an angle (FIG. 4). A pair of tips 42 are formed on at least one, and on preferably both, ends 32, 34 of the support 12, and are configured for engaging the flashlight 10 at selected points on the body 14 to support the flashlight 10 at an angle α (best seen in FIG. 4). The size of the angle α may vary depending on the needs of the user and the desired elevation of the flashlight. When the support 12 is not in use, the support is pressed against the body 14, and both ends 32, 34 are secured to the body 14, so that the support 12 becomes releasably secured to the body 14, and assumes a generally compact coaxial relationship thereto (best seen in FIG. 1). Once secured, the support 12 is almost flush with the body 14.

Included on the bottom end 34 is a radially projecting foot 44 which protrudes from the support 12 to allow better stability when the support elevates the flashlight 10 at the angle α. Referring now to FIG. 4, the support 12 is constructed and arranged to attach to points on the body 14, and to project at an angle, preferably an oblique angle γ, to a longitudinal axis of the body 14 to support the flashlight 10 in an elevated position.

Referring now to FIG. 5, an alternative embodiment of the support 12 is generally designated 50 and is similar to the support 12. Features of the support 50 which correspond to those of the support 12 are designated with identical reference numbers, including an inside diameter 22, an inside surface 30, a top end 32, a bottom end 34, and tips 42 which engage the flashlight 10. A main difference between the support 50 and the support 12 is that in the support 50 a center portion 52 is removed to reduce both the weight of the support 50 and material costs. It will be understood by those skilled in the art that the support 50 may be made of material which is sufficiently rigid to support the flashlight 10 in the elevated position despite the modified appearance.

By using either the support 12 or the support 50, the user's hands can remain free while the object being worked on remains under the illumination of a DC source which is more mobile and more safe to use in certain situations than an AC light supply. Similarly, the inherent clamping force of the support 12 around the body 14 provides convenient storage of the support 12 when it is not in use.

While a particular embodiment of the present flashlight support has been shown and described, it will be appreciated by those skilled in the art that changes and modifications may be made thereto without departing from the invention in its broader aspects and as set forth in the following claims.

I claim:

1. A combination flashlight and flashlight support comprising:

a flashlight having a body, an outside diameter, an illuminating end and a butt end;

a support which is constructed and arranged to have a longitudinal slot which when said support is pressed against the flashlight body, temporarily flexes open to releasably clamp onto said flashlight body, said support having a top end, a bottom end, and an inside diameter; and said support being constructed and arranged to releasably attach at at least said top end to said flashlight body with a friction fit without the use of extraneous hardware to project said support at an oblique angle to a longitudinal axis of said body to support said flashlight in an elevated position, and when not in use to be securable to said body in a coaxial position by means of said slot.

2. The combination as defined in claim 1 wherein said support has a semicircular tubular shape in cross-section which is dimensioned to circumscribe a portion of said body.

3. The combination as defined in claim 2 wherein said support is engaged on said body and covers approximately 190° degrees of said body when viewed in cross-section.

4. The combination as defined in claim 2 wherein said support is engaged on said body and covers 190° of said body when viewed in cross-section.

5. The combination as defined in claim 1 wherein said body has a length and said support has a length which is approximately one-half said body length.

6. The combination as defined in claim 1 wherein said bottom end of said support has a radially projecting foot.

7. The combination as defined in claim 1 wherein said support has a central cut-out portion.

8. A support for a flashlight, the flashlight having a body, an outside diameter, an illuminating end, and a butt end, said support comprising:

said support having a top end, a bottom end, an inside diameter, and a generally semi-circular tubular configuration; and said support constructed and arranged to be releasably secured at at least one of the ends of the flashlight with a friction fit and without the use of extraneous hardware to support the flashlight in an elevated position at an oblique angle to a longitudinal axis of said support and said support having an expandable longitudinal slot configured so that when said support is not in use said support being securable to the body in a coaxial gripping position by means of said slot.

9. The support of claim 8 wherein said support has a semi-circular tubular shape in cross-section which is dimensioned to circumscribe a portion of the body.

10. The combination as defined in claim 9 wherein said support covers approximately 190° degrees of the body when engaged on the body and viewed in cross-section.

11. The support as defined in claim 9 wherein said support covers 190° of the body when engaged on the body and viewed in cross-section.

12. The support of claim 8 wherein the body has a length and said support has a length which is approximately one-half the body length.

13. The support of claim 8 wherein said bottom end of said support has a radially extending foot.

14. The support of claim 8 wherein said support has a central cut-out portion.

* * * * *